Patented Apr. 17, 1945

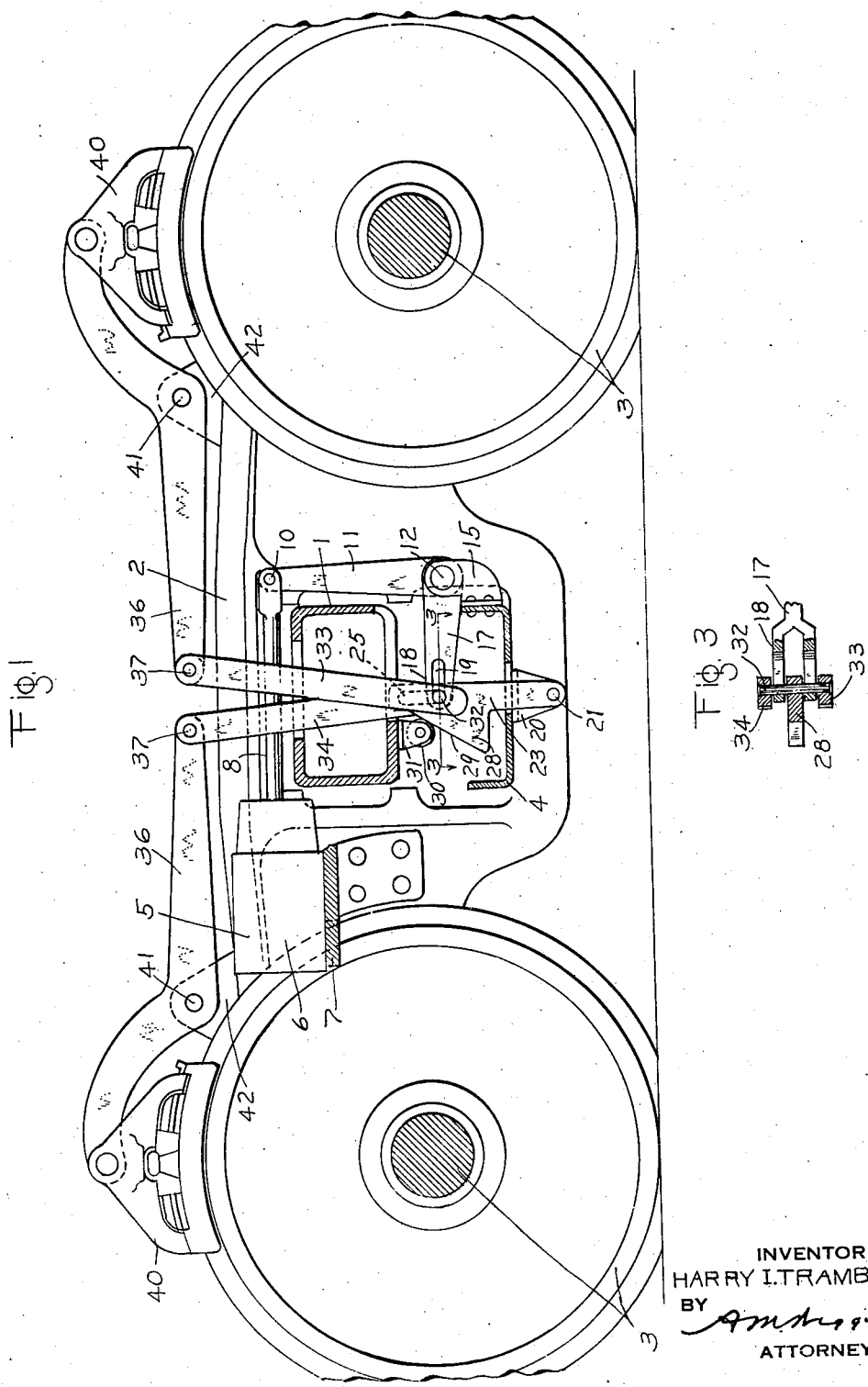

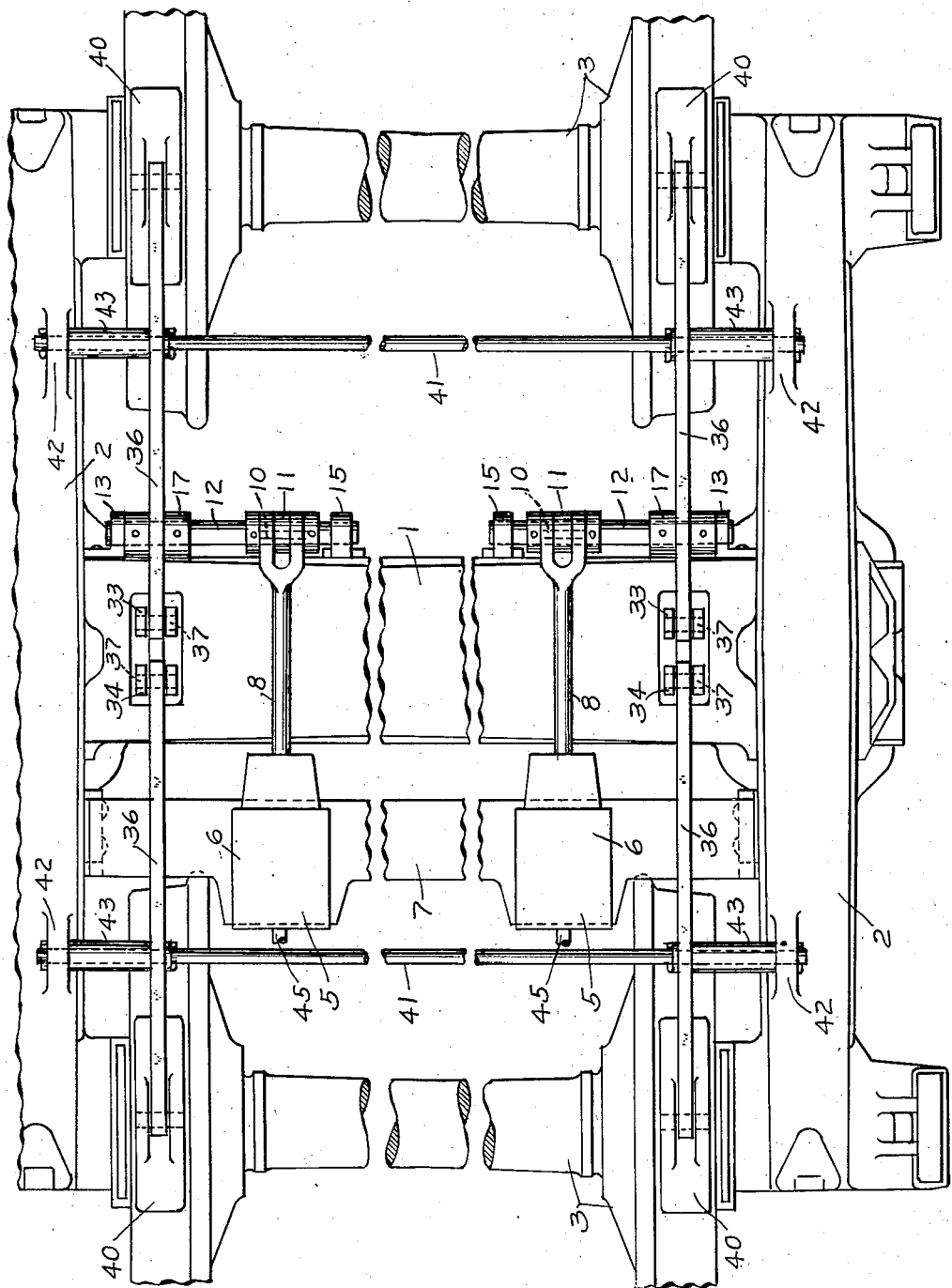

2,374,053

UNITED STATES PATENT OFFICE 2,374,053

VARIABLE LOAD BRAKE

Harry I. Tramblie, Aurora, Ill., assignor to The Westinghouse Air Brake Company, Wilmerding, Pa., a corporation of Pennsylvania Application February 27, 1943, Serial No. 477,384

11 Claims. (Cl. 188—195)

This invention relates to railway vehicle brake rigging and more particularly to variable load brake rigging of the type in which the leverage thereof may be automatically varied in accordance with variations in the weight of the load on the vehicle to correspondingly vary the force with which the brake may be applied.

An object of the invention is to provide an improved variable load brake apparatus of the above mentioned type, including novel means for effecting the adjustment of the rigging to provide the braking action called for by the weight carried by the vehicle.

Other objects and advantages will appear in the following detailed description of the invention.

In the accompanying drawings

Fig. 1 is a vertical sectional view taken longitudinally of a railway vehicle truck to illustrate the adjusting element and the parts of the truck with which they are associated.

Fig. 2 is a plan view of a vehicle truck embodying the adjusting elements and associated parts illustrated in Fig. 1.

Fig. 3 is a sectional view taken on the line 3—3 to Fig. 1.

As shown in the accompanying drawings, the variable load brake apparatus is applied to a railway vehicle truck which may be of the usual well known construction having a truck bolster 1, laterally spaced side frames 2 which are rigidly carried in the usual manner by the wheel and axle assemblies 3 and a spring plank 4 which is fixed to the truck side frames and upon which the usual truck bolster supporting springs (not shown) seat.

The variable load brake apparatus may comprise two brake cylinder devices 5, one of which is disposed adjacent each side frame 2. Each brake cylinder device is provided with a cylinder 6 which is rigidly secured in any suitable manner to a bracket 7 which preferably extends transversely of the truck and is rigidly secured at each end to one of the side frames 2. Each cylinder contains the usual piston (not shown) having a push rod 8 which is operatively connected at its outer end, by means of a pin 10, to the upper end of a brake cylinder lever arm 11 which extends at right angles to the push rod 8. Each lever 11 at its opposite or lower end is operatively connected to a shaft 12 and each shaft 12 is rotatably mounted at one end in a bracket 13 carried by the side frames 2.

The shafts 12 are disposed adjacent one side of the bolster and extend longitudinally thereof from each bracket 13 in a direction toward the longitudinal center line of the truck. At the end adjacent the longitudinal center line of the truck each shaft 12 is rotatably mounted in a bearing member 15 carried by the spring plank 4.

Operatively connected to each shaft 12 at the end adjacent each bracket 13 is a lever arm 17. As best shown in Fig. 1, the arm 17, at each side of the truck, extends at substantially right angles to the arm 11 and projects into the space between the lower or under side of the truck bolster 1 and the upper or top side of the spring plank 4. Each arm 17, at its outer end is provided with a jaw 18 having a slotted opening 19 which extends longitudinally of the arm.

Rigidly attached to and projecting downwardly from the under side of the spring plank 4 at each side of the truck is a bracket 20. Pivotally connected to each bracket, by means of a pin 21 is one end of an upwardly extending substantially vertically disposed member 23, which member passes through the jaw 18 of the arm 17. The upper end of each member is provided with a slotted opening 25 which extends longitudinally of the member and which, with the parts positioned as shown in Fig. 2, aligns with the outer end of the slotted opening 19 in the arm 17.

Each member 23 is also provided at one side thereof with a projection 28 having a downwardly and outwardly sloping surface 29 which is engaged by a roller 30. The roller 30 at each side of the truck is carried by a bracket 31 rigidly attached to and projecting downwardly from the under side of the bolster.

Contained in the slotted openings 19 and 25 of the arm 17 and member 23, respectively, at each side of the truck is a pin 32 which is carried by the lower ends of a pair of substantially vertically disposed rods 33 and 34, respectively, which are arranged one at each side of the jaw 18. The rods 33 and 34 at each side of the truck extend upwardly through suitable openings provided in the bolster to a point above the side frame 2 and each is connected at its upper end to one end of a brake applying lever 36 by means of a pin 37.

The brake applying levers 36 extend longitudinally of the truck and are arranged one at each side of the transverse center line of the truck.

Pivotally connected to the outer end of each brake applying lever 36 is a brake shoe head 40 to which is secured a brake shoe of the usual well known type which is adapted to be moved, through the medium of the head, into and out of engagement with the tread of the adjacent wheel. Each lever 36 is pivotally connected, at a point located nearer to the brake shoe carrying end of the lever than to the opposite end, to a rod 41 which extends transversely of the truck and which is carried by lugs 42 extending upwardly from and formed integral with the truck side frames.

In order to maintain the brake applying levers 36 and thereby the brake shoes in alignment with the tread of the adjacent wheel a spacer 43 is provided at each end of each rod.

Operation

Assuming the vehicle embodying the invention to be empty and the brakes on the vehicle released, the several parts of the apparatus will be in the position illustrated in the drawings, and consequently will be in condition for empty braking.

Since the brake cylinder device 5 at each side of the truck and the mechanism associated with each are substantially identical it will be deemed sufficient for the purpose of this specification to describe the operation of one brake cylinder device and the mechanism associated therewith.

When it is desired to effect an application of the brakes, fluid under pressure is supplied to the brake cylinder device in the usual manner by way of a pipe 45. Fluid under pressure thus supplied to the brake cylinder devices causes the usual piston thereof (not shown) to operate to move the push rod 8 in a direction toward the right hand from the position in which it is shown in the drawings. As the push rod 8 moves in this direction it causes the connected brake cylinder lever arm 11 shaft 12 and arm 17 to rock in a clockwise direction. The arm 17 as it is thus rocked in this direction acts through the medium of pin 32 to force the rods 33 and 34 upwardly, the pin 32 moving upwardly in the slotted opening 25 provided in the member 23.

The rods 33 and 34 as they are thus moved cause the connected brake applying levers 36 to rock about the rods 41 and move the brake shoes associated with the levers into frictional engagement with the treads of the adjacent wheels to effect an application of the brakes.

When it is desired to effect a release of the brakes fluid under pressure is vented from the brake cylinder 5 to the atmosphere by way of pipe 45 in the usual well known manner. As the pressure of fluid in the brake cylinder reduces, due to such venting, the usual brake cylinder release spring (not shown) acts on the brake cylinder piston to cause the push rod 8 to move in a direction toward the left hand to the position in which it is shown in the drawings.

The push rod 8, as it is thus moved, causes the arm 11, shaft 12 and arm 17 to rock in a counter-clockwise direction thereby pulling the rods 33 and 34 downwardly, the pin 32 moving in the slotted opening 25 in the member 23.

The rods 33 and 34 as they are thus moved cause the brake applying levers 36 to rock about the rods 41 to move the brake shoes out of frictional engagement with the treads of the adjacent wheels to effect a release of the brakes.

Assuming now that, while the vehicle brakes are released, lading is placed on the body of the vehicle. Under the influence of the additional weight which the lading imposes on the vehicle body and thereby the truck bolster, the bolster springs (not shown) will yield and permit the bolster and the body of the vehicle to move downwardly relative to the spring plank 4.

As the bolster 1 moves downwardly relative to the spring plank 4, the bracket 31 and roller 30 carried by the bolster is caused to move in the same direction. Since roller 30 engages surface 29 of the member 23, the roller will, as it moves downwardly, cause the member 23 to rock in a clockwise direction about the pivot pin 21. As the member 23 rocks in this direction the pin 32 is caused to move in the slotted opening 19 of the arm 17 in a direction toward the shaft 12, thus shortening the effective length of the arm and thereby increasing the power of the rigging. If the pin 32 and thereby the rods 33 and 34 are moved in the slotted opening 19 of the arm 17 in a direction away from the shaft 12 the leverage ratio of the rigging will be decreased.

From this it will be understood that the distance between the shaft 12 and the pin 32 is automatically varied according to the load on the vehicle as determined by the degree of truck spring compression to provide for the degree of braking called for by the weight of the lading carried by the vehicle.

When the loading of the vehicle is completed, the pin 32 will be positioned relative to the shaft 12 in accordance with the weight carried by the vehicle. Now when it is desired to effect an application of the brakes fluid under pressure is again supplied to the brake cylinder causing the push rod 8 to move outwardly and actuate the brake shoes into engagement with the treads of the adjacent wheels in the same manner as hereinbefore described in connection with empty vehicle braking.

When it is desired to effect a subsequent release of the brakes after an application has been effected on either a partially or fully loaded vehicle, fluid under pressure is released from the brake cylinder in the usual manner and the brakes are released in the same manner as hereinbefore described in connection with a release of the brakes following an application on an empty vehicle.

Having now described my invention, what I claim as new and desire to secure by Letters Patent, is:

1. In a variable load brake rigging for a vehicle truck having a relatively stationary part carried by the truck wheels and also having a part movable vertically relative to the stationary part, in combination, a brake element movable into and out of braking engagement with one of the wheels of the truck, a lever carried by the stationary part of the truck operative for actuating said brake element, a member movable vertically for operating said lever, an arm pivotally carried by a stationary part of the truck for actuating said member, means operative to actuate sid arm, and means including a roller member carried by a movable part of the truck and a pivotally mounted member carried by a stationary part of the truck operative in response to relative vertical movement between the stationary and the movable parts of the truck for varying the effective length of said arm.

2. In a variable load brake rigging for a vehicle truck having a relatively stationary part carried by the truck wheels and also having a part movable vertically relative to the stationary part, in combination, a brake element movable into and out of braking engagement with one of the wheels of the truck, a lever carried by the stationary part of the truck operative for actuating said brake element, a member movable vertically for operating said lever, an arm pivotally carried by a stationary part of the truck for actuating said member, means operative to actuate said arm, means pivotally carried by a stationary part of the truck operative to vary the effective length of said arm, and a roller carried by a movable part of the truck adapted to operate the second mentioned means in response to relative vertical movement between the stationary and movable parts of the truck.

3. In a variable load brake rigging for a vehicle truck having a relatively stationary part carried by the truck wheels and also having a part movable vertically relative to the stationary part, in combination, a brake element movable into and out of braking engagement with one of the wheels of the truck, a lever carried by the stationary part of the truck operative for actuating said brake element, a member movable vertically for operating said lever, an arm pivotally carried by a stationary part of the truck for actuating said member, means operative to actuate said arm, vertically disposed means pivotally carried by a stationary part of the truck and operative to vary the effective length of said arm, said vertically disposed means having at one side thereof an outwardly and downwardly sloping surface, a roller carried by a movable part of the truck and engaging said surface, said roller being operative in response to vertical movement of the movable part of the truck for actuating said vertically disposed means.

4. In a variable load brake rigging for a vehicle truck having a relatively stationary part carried by the truck wheels and also having a part movable vertically relative to the stationary part, in combination, a brake element movable into and out of braking engagement with one of the wheels of the truck, a lever carried by the stationary part of the truck operative for actuating said brake element, a member movable vertically for operating said lever, an arm pivotally carried by a stationary part of the truck for actuating said member, means operative to actuate said arm, said means including a rockable shaft, operative to actuate said arm, an arm operative to actuate said shaft, a brake cylinder carried by a stationary part of the truck operative to actuate the second mentioned arm and adjusting means carried by a stationary part of the truck operative in response to relative vertical movement between the stationary and movable parts of the truck for varying the effective length of the first mentioned arm.

5. In a variable load brake rigging for a truck of the type having a fixed part and a part movable vertically relative to the fixed part in response to variations in the weight imposed thereon, in combination, a wheel of the truck, a brake element movable into and out of frictional braking engagement with said wheel, a lever carried by a fixed part of the vehicle for actuating said brake element, a member movable vertically for actuating said lever, an arm operative for actuating said member said arm having a longitudinally extending slotted opening, a pin disposed in said slotted opening and movable to different positions relative to the arm for varying the effective length of said arm, rockable means carried by a fixed part of the truck for actuating said arm, means operative to actuate said rockable means and means associated with the fixed and the movable part of the truck and operative by the movable part in accordance with the load imposed on the movable part for positioning said pin.

6. In a variable load brake rigging for a truck of the type having a fixed part and a part movable vertically relative to the fixed part in response to variations in the weight imposed thereon, in combination, a wheel of the truck, a brake element movable into and out of frictional braking engagement with said wheel, a lever carried by a fixed part of the vehicle for actuating said brake element, a member movable vertically for actuating said lever, an arm operative for actuating said member said arm having a longitudinally extending slotted opening, a pin disposed in said slotted opening and movable to different positions relative to the arm for varying the effective length of said arm, rockable means carried by a fixed part of the truck for actuating said arm, means including a brake cylinder and a brake cylinder lever for actuating said rockable means, and means associated with the fixed and the movable part of the truck and operative in accordance with the load imposed on said movable part for positioning said pin.

7. In a variable load brake rigging for a truck of the type having a fixed part and a part movable vertically relative to the fixed part in response to variations in the weight imposed thereon, in combination, a wheel of the truck, a brake element movable into and out of engagement with said wheel, a pivotally mounted lever disposed longitudinally of the truck for actuating said brake element, means operative to actuate said lever, said means including an arm having a longitudinally extending slotted opening, a pin disposed in said slotted opening movable to different positions relative to the length of the arm for varying the effective length of the arm, vertically disposed means pivotally mounted on an unsprung part of the truck and operative for positioning the pin relative to the length of the arm, and means carried by a sprung part of the truck operative in accordance with the load carried by the vehicle for effecting operation of said vertically disposed means to position said pin.

8. In a variable load brake rigging for a truck, in combination, a brake element operative for effecting an application of the brakes, a lever disposed longitudinally of the truck for operating said brake element, a member movable vertically of the truck for actuating said lever, means operative to actuate said member, said means including an arm, connecting means operatively connecting said arm and member, said connecting means having a position for providing empty vehicle braking and being movable therefrom to various other positions through a loaded vehicle zone for providing loaded vehicle braking; adjusting means pivotally carried by a stationary part of the truck and movable in response to relative verticle movement of a movable part of the truck relative to a stationary part of the truck for positioning said connecting means in said loaded vehicle zone.

9. In a variable load brake rigging for a vehicle truck of the type having a pair of fixed laterally spaced side frames with a spring plank fixed to said side frames and a truck bolster vertically movable relative to the spring plank and the side frames in response to variations in weight imposed thereon, in combination, a lever pivotally mounted on one of the side frames and operatively connected to a brake member to be operated for effecting either an application or a release of the vehicle brakes, a member movable vertically for actuating said lever, a rockable arm for operating said member, a shaft rockably mounted on the spring plank for actuating said arm, adjusting means pivotally carried by the spring plank operative to vary the effective length of said arm, and means carried by said truck bolster operative in response to relative vertical movement between said spring plank and the truck bolster for operating said adjusting means.

10. In a variable load brake rigging for a vehicle truck of the type having a pair of fixed laterally spaced side frames with a spring plank fixed to said side frames and a truck bolster vertically movable relative to the spring plank and the side frames in response to variations in weight imposed thereon, in combination, a lever pivotally mounted on one of the side frames and operatively connected to a brake member to be operated for effecting either an application or a release of the vehicle brakes, a member movable vertically for actuating said lever, a rockable arm for operating said member, a shaft rockably mounted on the spring plank for actuating said arm, a brake cylinder carried by the truck side frames for actuating said shaft, a vertically disposed member pivotally carried by the spring plank operative to vary the effective length of said arm, and a roller carried by the bolster operative in response to relative vertical movement between the spring plank and the bolster for operating said vertically disposed member.

11. In a variable load brake rigging for a vehicle truck of the type having a pair of laterally spaced side frames carried by a pair of wheels at each end thereof, one wheel of each pair being disposed at one side of the truck and the other wheel of each pair disposed at the other side of the truck and a bolster movable vertically relative to the side frames extending transversely of the truck and disposed substantially intermediate the ends of said side frames, the combination, with a pair of brake elements disposed at one side of the truck arranged one adjacent the wheel at one end of the truck and the other adjacent the wheel at the other end of the truck and movable into and out of frictional engagement with the adjacent wheels, of a pair of longitudinally extending levers carried by the side frame at the same side of the truck and operative for actuating said brake elements, one of said levers extending from a point adjacent said bolster in a direction toward one end of the truck and the other extending from a point adjacent said bolster in a direction toward the other end of the truck, a pair of vertically movable members for actuating said levers, an arm operative to actuate said pair of members, said arm having a longitudinally extending slotted opening, a pin disposed in said slotted opening movable to different positions relative to the length of the arm for varying the effective length of said arm, vertically disposed means pivotally mounted on a part rigidly carried by the side frames and operative for positioning the pin along the length of the arm, and means carried by the truck bolster and operative in accordance with the load imposed on said bolster for effecting operation of said vertically disposed means.

HARRY I. TRAMBLIE.